(12) United States Patent
Jee

(10) Patent No.: US 6,637,110 B2
(45) Date of Patent: Oct. 28, 2003

(54) PIPE JOINING METHOD USING SHAPE MEMORY ALLOY

(75) Inventor: Kwang-Koo Jee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 10/142,672

(22) Filed: May 10, 2002

(65) Prior Publication Data

US 2002/0175203 A1 Nov. 28, 2002

(30) Foreign Application Priority Data

May 11, 2001 (KR) .......................... 2001-25901

(51) Int. Cl.[7] .............. B23P 6/00; B23P 11/02; F16B 4/00; F16L 25/00
(52) U.S. Cl. ............... 29/890.031; 29/445; 29/447; 29/450; 285/381.1; 285/381.2; 285/381.3
(58) Field of Search ................. 228/126, 129, 228/131, 245, 246; 285/149.1, 381.1–382.7; 29/445–447, 450, 890.03

(56) References Cited

U.S. PATENT DOCUMENTS

| | | | | |
|---|---|---|---|---|
| 3,781,966 A | * | 1/1974 | Lieberman ............. | 29/890.031 |
| 4,198,081 A | * | 4/1980 | Harrison et al. ......... | 285/381.2 |
| 4,621,844 A | * | 11/1986 | Kipp et al. .............. | 285/381.3 |
| 4,773,680 A | * | 9/1988 | Krumme ................... | 285/381.2 |
| 5,174,616 A | * | 12/1992 | Hagio et al. .............. | 285/381.3 |
| 5,265,919 A | * | 11/1993 | Takemoto et al. ........ | 285/381.1 |
| 5,338,070 A | * | 8/1994 | Horikawa et al. ...... | 285/148.23 |
| 5,687,995 A | * | 11/1997 | Mori et al. ............... | 285/381.2 |
| 6,354,634 B1 | * | 3/2002 | Dischler ..................... | 285/231 |
| 6,371,030 B1 | * | 4/2002 | Gilman et al. .............. | 102/529 |

FOREIGN PATENT DOCUMENTS

| | | | |
|---|---|---|---|
| JP | 02-286991 A | * | 11/1990 |
| JP | 04-300487 A | * | 10/1992 |
| JP | 09-13743 A | * | 1/1997 |

\* cited by examiner

*Primary Examiner*—Tom Dunn
*Assistant Examiner*—L. Edmondson
(74) *Attorney, Agent, or Firm*—Scully, Scott, Murphy & Presser

(57) ABSTRACT

For a pipe joining method using shape memory alloy capable of preventing a shape memory capacity loss due to a pipe's tolerance, a shape memory alloy joint having an inner diameter greater/less than an outer diameter of pipes to be joined is installed at the outer/inner circumference of a pipe joining portion, and the pipes and the shape memory alloy joint are simultaneously enlarged/reduced. In addition, a general metal joint having an inner diameter greater/less than an outer diameter of shape memory alloy pipes to be joined is installed at the outer/inner circumference of a shape memory alloy pipe joining portion, and the shape memory alloy pipes and the general metal joint are simultaneously enlarged/reduced.

7 Claims, 4 Drawing Sheets

PIPE JOINING METHOD USING SHAPE MEMORY ALLOY

BACKGROUND OF THE INVENTION

1. Field of the Invention

The present invention relates to a pipe joining method using shape memory alloy, and in particular to a method for joining pipes with a shape memory alloy joint and a method for joining shape memory alloy pipes with a general metal joint.

2. Description of the Prior Art

Welding techniques have been largely used for joining pipes until now, however, due to welding defect, it is regarded preferable to use a mechanical method for connecting or jointing in joining pipes. Because shape memory alloy can be easily fabricated as a pipe joint and there is no defect occurrence, recently shape memory alloy is being watched with keen interest as a pipe joint.

The conventional pipe connecting method using shape memory alloy will be described with reference to accompanying FIGS. 1a~1c. For example, for joining two pipes 4 having an outer diameter of 100 mm, a shape memory alloy joint 2 having an inner diameter of 97 mm is prepared as shown in FIG. 1a. The shape memory alloy joint 2 is expanded below transformation temperature so as to have the inner diameter not less than 100 mm as shown in FIG. 1b. The enlarged shape memory alloy joint 2 is installed at the outer circumference of the pipes 4, heated at a temperature not less than the transformation temperature as shown in FIG. 1c. By a shape memory effect, the shape memory alloy joint 2 tends to return the original shape having an inner diameter of 97 mm, however, it can not return because of the pipes 4 and joins them strongly. In more detail, it is the same that a joint having an inner diameter of 97 mm is forcibly installed at the outer diameter of a pipe having an outer diameter of 100 mm, and accordingly the joint provides a strong joining force.

However, in general, because a pipe has a tolerance, there are problems to be considered. When a tolerance is 2%, although a nominal outer diameter is 100 mm, an outer diameter is actually 98~102 mm. In that case, in order to insert the pipe, an enlarged joint has to have an inner diameter not less than 102 mm. When the joint is heated at a temperature not less than transformation temperature, the joint has to be reduced not greater than 98 mm in order to contact to the pipe. Accordingly the joint has to have a shape memory capacity as 4% at a minimum. In result, because of the pipe's tolerance, a shape memory capacity corresponded to twice of the tolerance may be lost. When a shape memory alloy is enlarged from 100 mm to 101 mm and returns to 100 mm by heating, its shape memory capacity is 1%, and because a circumference of the pipe is in proportion to a diameter, it is possible to calculate a shape memory capacity with a diameter.

Among shape memory alloys developed until now, because NiTi alloy has a shape memory capacity of about 8%, it can sufficiently solve problems due to a tolerance of a pipe. However, because it is too expensive, its application is limited. Cu base alloy has a good memory capacity in theory, however, because a grain is too big, it may be damaged in deformation as 3%, and accordingly it is little used due to bad mechanical characteristics.

In the early 1980', iron base shape memory alloy such as Fe—Mn—Si alloy having a low unit price and a good mechanical characteristic was developed and watched with keen interest, however, it only has a shape memory capacity of about 2%. In order to improve its shape memory capacity, enlarging and heating have to be repeatedly performed and a tolerance of a pipe has to be lowered, etc., and accordingly there are many problems in putting iron base shape memory alloy to practical use.

In addition, a cost related to conveyance and safekeeping has to be considered. A shape memory joint has a strong joining force at a temperature not less than a transformation temperature. In a NiTi alloy joint, a transformation temperature is between −50° C.~−100° C., generally it is enlarged at a liquid nitrogen temperature and transported to a factory after being put into liquid nitrogen. After that, two pipes are inserted into the NiTi alloy joint (the joint connects the two pipes), and with temperature rising not less than a transformation temperature, the NiTi alloy joint joins the pipes. In more detail, because the joint has to be kept in liquid nitrogen in order to maintain a temperature of the joint not greater than a transformation temperature, a cost related to alloy storage is too high.

As described above, in the conventional method, there are many problems such as a shape memory capacity loss due to a pipe tolerance, limitation in the kind of applicable shape memory alloy and a cost increase according to enlarged joint storage.

SUMMARY OF THE INVENTION

In order to solve the above-mentioned problems, it is an object of the present invention to provide a pipe joining method using shape memory alloy which is capable of preventing a shape memory capacity loss due to a pipe tolerance. In result, shape memory alloy having a small shape memory capacity can be used, and it is possible to join pipes strongly although the pipes have a large tolerance.

In addition, it is another object of the present invention to provide a pipe joining method using shape memory alloy which is capable of eliminating an additional cost occurrence according to conveyance and safekeeping of a processed joint.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1a illustrates a shape memory alloy joint having an inner diameter less than an outer diameter of pipes to be joined;

FIG. 1b illustrates the enlarged shape memory alloy to be installed at the outer circumference of the pipes;

FIG. 1c illustrates the shape memory alloy joint installed at the outer circumference of the pipes and heated at a temperature not less than a transformation temperature to join the pipes;

FIG. 2a illustrates a shape memory alloy joint having an inner diameter greater than an outer diameter of pipes to be joined and installed at the outer circumference of the pipes;

FIG. 2b illustrates the pipes enlarged so as to have the same outer diameter as the inner diameter of the shape memory alloy joint;

FIG. 2c illustrates the shape memory alloy joint enlarged together with the pipes and heated at a temperature not less than a transformation temperature in order to join the pipes;

FIG. 3a illustrates a shape memory alloy joint having an outer diameter less than an inner diameter of the pipes and installed at the outer circumference of the pipes;

FIG. 3b illustrates the pipes reduced so as to have the same inner diameter as the outer diameter of the shape memory alloy joint;

FIG. 3c illustrates the shape memory alloy joint enlarged together with the pipes and heated at a temperature not less than a transformation temperature in order to join the pipes;

FIG. 4a illustrates a general metal joint installed at the outer circumference of shape memory alloy pipes, reduced together with the pipes and heated in order to join the pipes; and FIG. 4b illustrates a general metal joint installed at the inner circumference of shape memory alloy pipes, enlarged together with the pipes and heated in order to join the pipes.

DETAILED DESCRIPTION OF THE PREFERRED EMBODIMENT

Hereinafter, in a pipe joining method using a shape memory alloy joint, a shape memory alloy joint having an inner diameter greater/less than an outer diameter of pipes to be joined is installed at the outer/inner circumference of a pipe joining portion, and the pipes and the shape memory alloy joint are simultaneously enlarged/reduced.

In addition, in a shape memory alloy pipe joining method using a general metal joint, a general metal joint having an inner diameter greater/less than an outer diameter of shape memory alloy pipes to be joined is installed at the outer/inner circumference of a shape memory alloy pipe joining portion, and the shape memory alloy pipes and the general metal joint are simultaneously enlarged/reduced.

Herein, the enlargement or reduction can be performed at a temperature not greater/less than a transformation temperature.

In addition; the shape memory alloy is one of NiTi base, Cu base (Cu—Zn—Al and Cu—Al—Ni, etc.) and Fe base (Fe—Mn—Si and Fe—Ni—Co—Ti, etc.).

Hereinafter, the preferred embodiments of the present invention will be described with reference to accompanying drawings.

In the conventional method, only a shape memory alloy joint is enlarged. However, in the present invention, after installing a joint at the outer or inner circumference of pipes to be joined, the pipes and the joint are simultaneously enlarged/reduced.

Figure 2A:
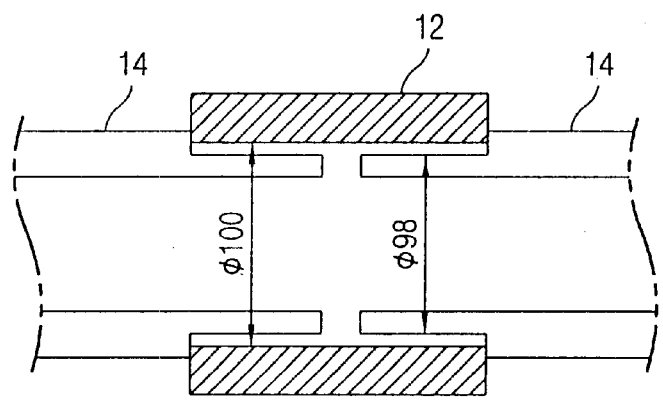
FIGS. 2a~2c schematically illustrate a pipe joining method using shape memory alloy in accordance with a first embodiment of the present invention.
Figure 2B:
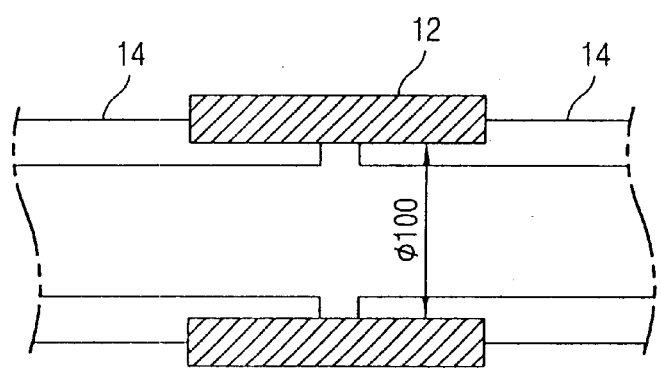
Figure 2C:
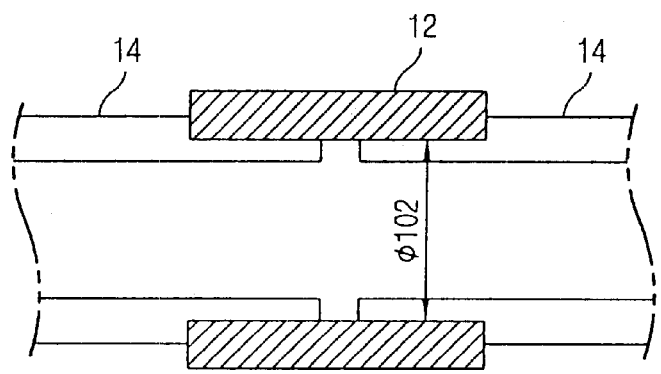

FIGS. 2a~2c illustrate installing a shape memory alloy joint 12 at the outer circumference of a pipe 14 to be joined and enlarging the pipe 14 in accordance with a first embodiment of the present invention.

As depicted in FIG. 2a, when a nominal outer diameter of the pipe 14 is 98 mm and an inner diameter of the joint 12 is 100 mm, because the inner diameter of the joint 12 is greater than the outer diameter of the pipe 14, the joint 12 can be easily installed at the outer circumference of a pipe joining portion.

As depicted in FIG. 2b, at the early stage of enlarging, only the pipe 14 is enlarged, after the pipe 14 is enlarged as 100 mm, the pipe 14 and the joint 12 are enlarged together. For example, as depicted in FIG. 2c, when the pipe is enlarged as 102 mm and heated at a temperature not less than a transformation temperature, the pipe 14 maintains its outer diameter as it is (102 mm), however, the joint 12 tends to return to the original state as 100 mm, and accordingly the joint 12 strongly joins the pipe 14.

Figure 3A:
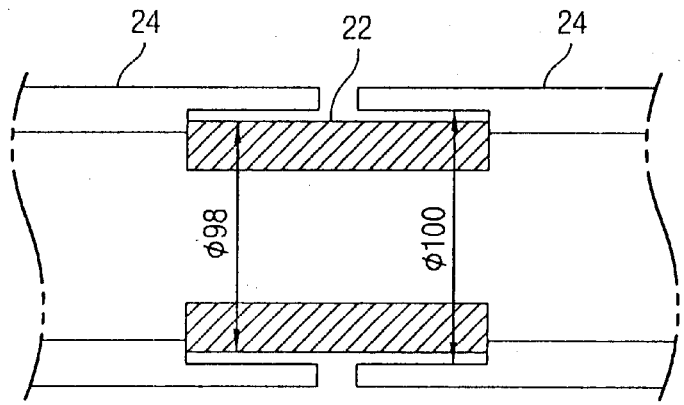
FIGS. 3a~3c schematically illustrate a pipe joining method using shape memory alloy in accordance with a second embodiment of the present invention.
Figure 3B:
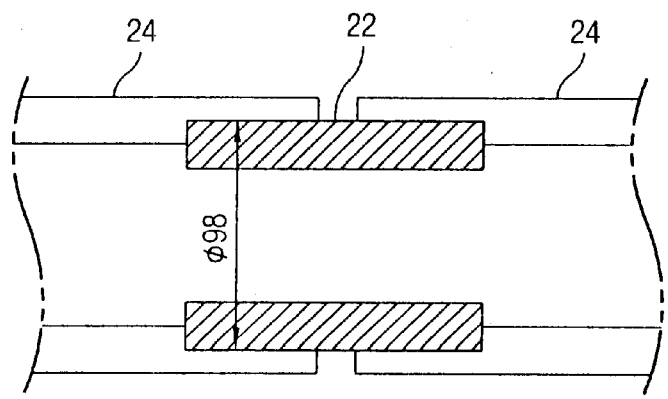
Figure 3C:
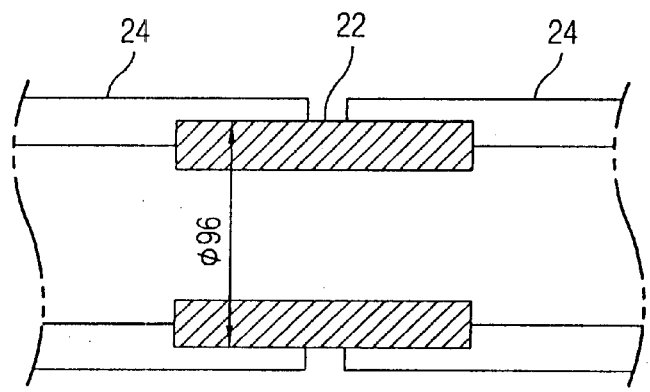

FIGS. 3a~3c illustrate installing the shape memory alloy joint 22 at the inner circumference of the pipe 24 to be joined and reducing the pipe 24 in accordance with a second embodiment of the present invention. This method can be easily applied in comparison with the enlarging method as shown in FIGS. 2a~2c.

As depicted in FIG. 3a, when a nominal inner diameter of the pipe 24 is 100 mm and an outer diameter of the joint 22 is 98 mm, because the outer diameter of the joint 22 is less than the inner diameter of the pipe 24, the joint 22 can be easily installed at the inner circumference of a pipe joining portion. As depicted in FIG. 3b, at the early stage of reducing, only the pipe 24 is reduced, after the pipe 24 is reduced as 98 mm, the pipe 24 and the joint 22 are reduced together. For example, as depicted in FIG. 3c, when the pipe 24 is reduced as 96 mm and heated at a temperature not less than a transformation temperature, the pipe 24 maintains its outer diameter as it is (96 mm), however, the joint 22 tends to return to the original state as 98 mm, and accordingly the joint 22 strongly joins the pipe 24.

In more detail, in the present invention, because a pipe's tolerance is eliminated during the process, there is no shape memory capacity loss due to a tolerance. Accordingly, it is possible to apply alloy having a low shape memory capacity to joining pipes having a large tolerance.

Figure 1A:
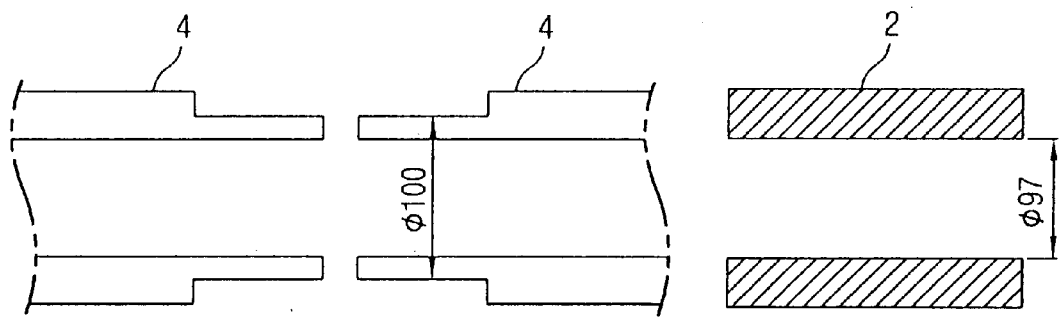
FIGS. 1a~1c schematically illustrate the conventional pipe joining method using shape memory alloy.
Figure 1B:
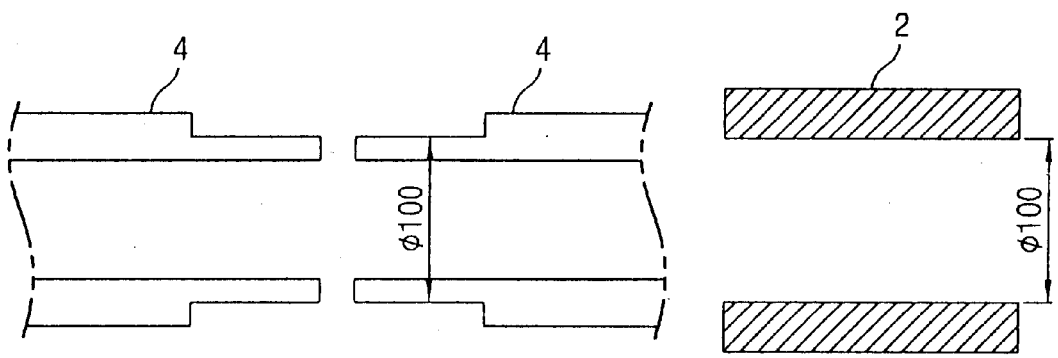
Figure 1C:
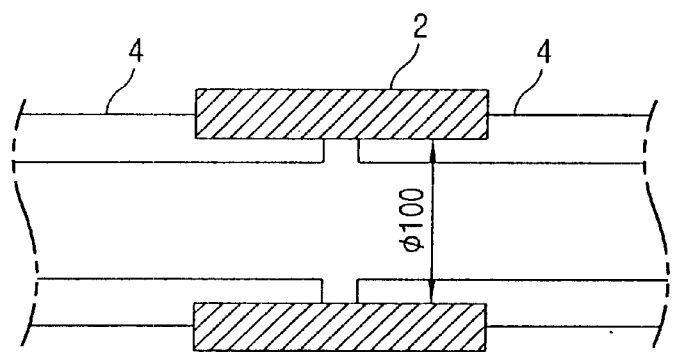

In addition, as another advantage of the present invention, processing can be performed at a temperature not less than a transformation temperature as well as a temperature not greater than the transformation temperature. In the conventional method as shown in FIGS. 1a~1c, after a shape memory joint is enlarged at a temperature not greater than a transformation temperature, when a temperature rises not less than the transformation temperature, the shape memory joint is reduced, and accordingly a temperature has to be maintained not greater than the transformation temperature from enlargement to installment. However, in the present invention, because a pipe can always prevent a joint from returning to the original shape (due to a shape memory effect), there is no need to maintain a certain temperature according to a transformation temperature. Accordingly, it is possible to save an additional cost in conveyance and storing in comparison with the conventional art.

Figure 4A:
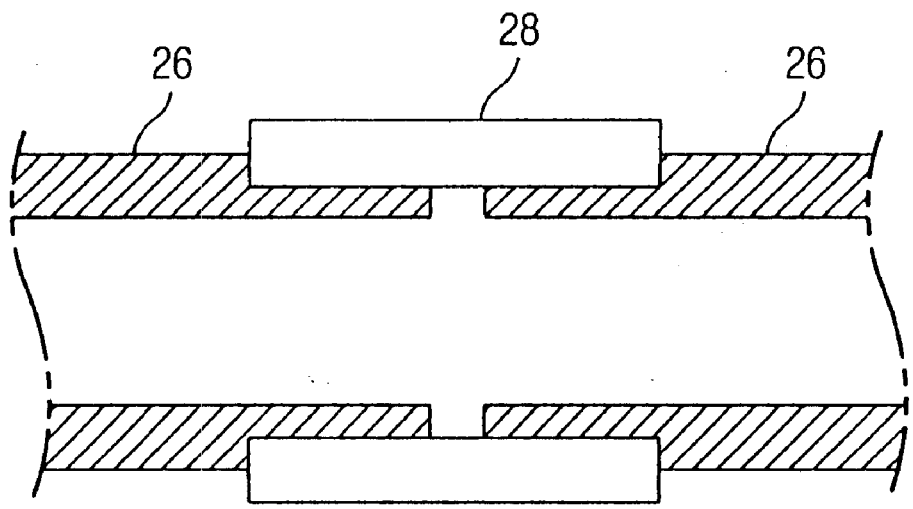
FIGS. 4a and 4b schematically illustrate a shape memory alloy pipe joining method using a general metal joint in accordance with a third embodiment of the present invention.
Figure 4B:
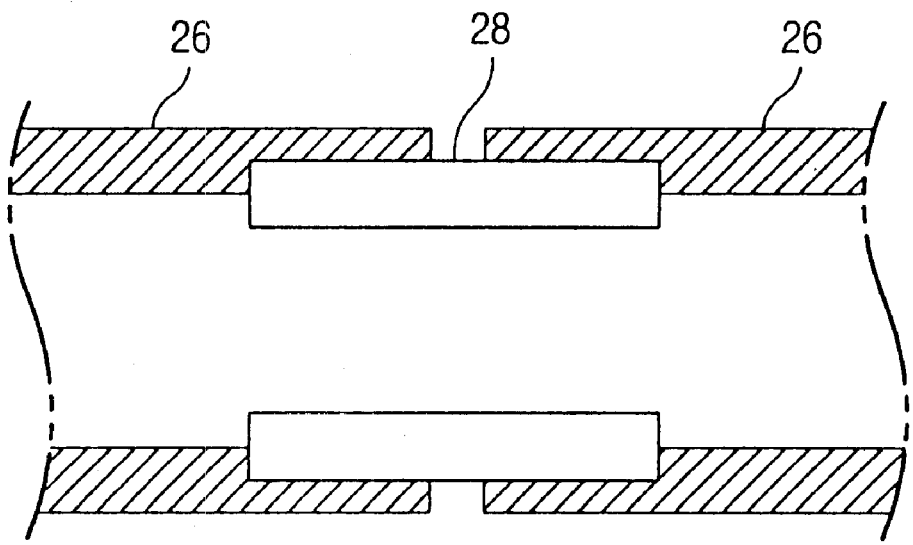

FIGS. 4a and 4b illustrate joining a shape memory alloy pipe 26 by using a general metal joint 28 in accordance with a third embodiment of the present invention.

As depicted in FIG. 4a, the general metal joint 28 is installed at the outer circumference of the shape memory alloy pipe 26, the pipe 26 and the joint 28 are reduced together, heated and joined. As depicted in FIG. 4b, the general metal joint 28 is installed at the inner circumference of the shape memory alloy pipe 26, enlarged together, heated and joined.

In the present invention, by processing a pipe and a shape memory alloy joint together, there is no shape memory capacity loss due to a pipe tolerance. Accordingly, it is possible to apply a joint made of alloy having a small shape memory capacity to join pipes having a large tolerance. In addition, processing can be performed at a temperature not less than a transformation temperature as well as not greater than the transformation temperature.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A pipe joining method using shape memory alloy, comprising: installing a shape memory alloy joint having an inner diameter greater than an outer diameter of a pipe at the outer circumference of a pipe joining portion; and through the intermediary of a concurrent thermal treatment transforming both a pipe and pipe joining portions for simultaneously enlarging the pipe and the shape memory alloy joint.

2. A pipe joining method using shape memory alloy, comprising: installing a shape memory alloy joint having an outer diameter less than an inner diameter of a pipe at the inner circumference of a pipe joining portion; and through the intermediary of a concurrent thermal treatment transforming both a pipe and pipe joining portions for simultaneously reducing the pipe and the shape memory alloy joint.

3. A pipe joining method using shape memory alloy, comprising: installing a general metal joint having an inner diameter greater than an outer diameter of a shape memory alloy pipe at the outer circumference of a shape memory alloy pipe joining portion; and through the intermediary of a concurrent thermal treatment transforming both a pipe and pipe joining portions for simultaneously reducing the shape memory alloy pipe and the general metal joint.

4. A pipe joining method using shape memory alloy, comprising: installing a general metal joint having an outer diameter less than an inner diameter of a shape memory alloy pipe at the inner circumference of a shape memory alloy pipe joining portion; and through the intermediary of a concurrent thermal treatment transforming both a pipe and pipe joining portions for simultaneously enlarging the shape memory alloy pipe and the general metal joint.

5. The method of any one of claims 1 through 4, wherein the enlargement or reduction is performed at a temperature not greater than a transformation temperature of the shape memory alloy.

6. The method of any one of claims 1 through 4, wherein the enlargement or reduction is performed at a temperature not less than a transformation temperature of the shape memory alloy.

7. The method of any one of claims 1 through 4, wherein the shape memory alloy is selected from the group of materials consisting of one of NiTi base, Cu base (Cu—Zn—Al and Cu—Al—Ni,) and Fe base (Fe—Mn—Si and Fe—Ni—Co—Ti,).

* * * * *